United States Patent [19]

Hanna

[11] 4,445,246

[45] May 1, 1984

[54] TENSIONING DEVICE FOR WRAPAROUND BRUSHING MECHANISM

[76] Inventor: Daniel C. Hanna, 1133 SW. Rivington Dr., Portland, Oreg. 97201

[21] Appl. No.: 404,279

[22] Filed: Aug. 2, 1982

[51] Int. Cl.³ .............................................. B60S 3/06
[52] U.S. Cl. ............................ 15/53 AB; 15/DIG. 2
[58] Field of Search .......... 15/53 A, 53 AB, DIG. 2, 15/97 B, 4

[56] References Cited

U.S. PATENT DOCUMENTS 3,350,733 11/1967 Hanna ............................... 15/53 AB
3,581,334 6/1971 Follis ................................ 15/53 AB
3,704,476 12/1972 Hanna ............................... 15/53 AB Primary Examiner—Edward L. Roberts
Attorney, Agent, or Firm—Klarquist, Sparkman, Campbell, Leigh & Whinston

[57] ABSTRACT

An adjustable tensioning device mounted to a wraparound brushing mechanism in a car washing installation varies the influence of the biasing mechanism thereof. The adjustable tensioning device is capable of changing the leverage applied to the brushing mechanism to vary the overall amount of brush engagement force against the surface of the car and selecting the location on the car for application of maximum brushing engagement force.

4 Claims, 6 Drawing Figures

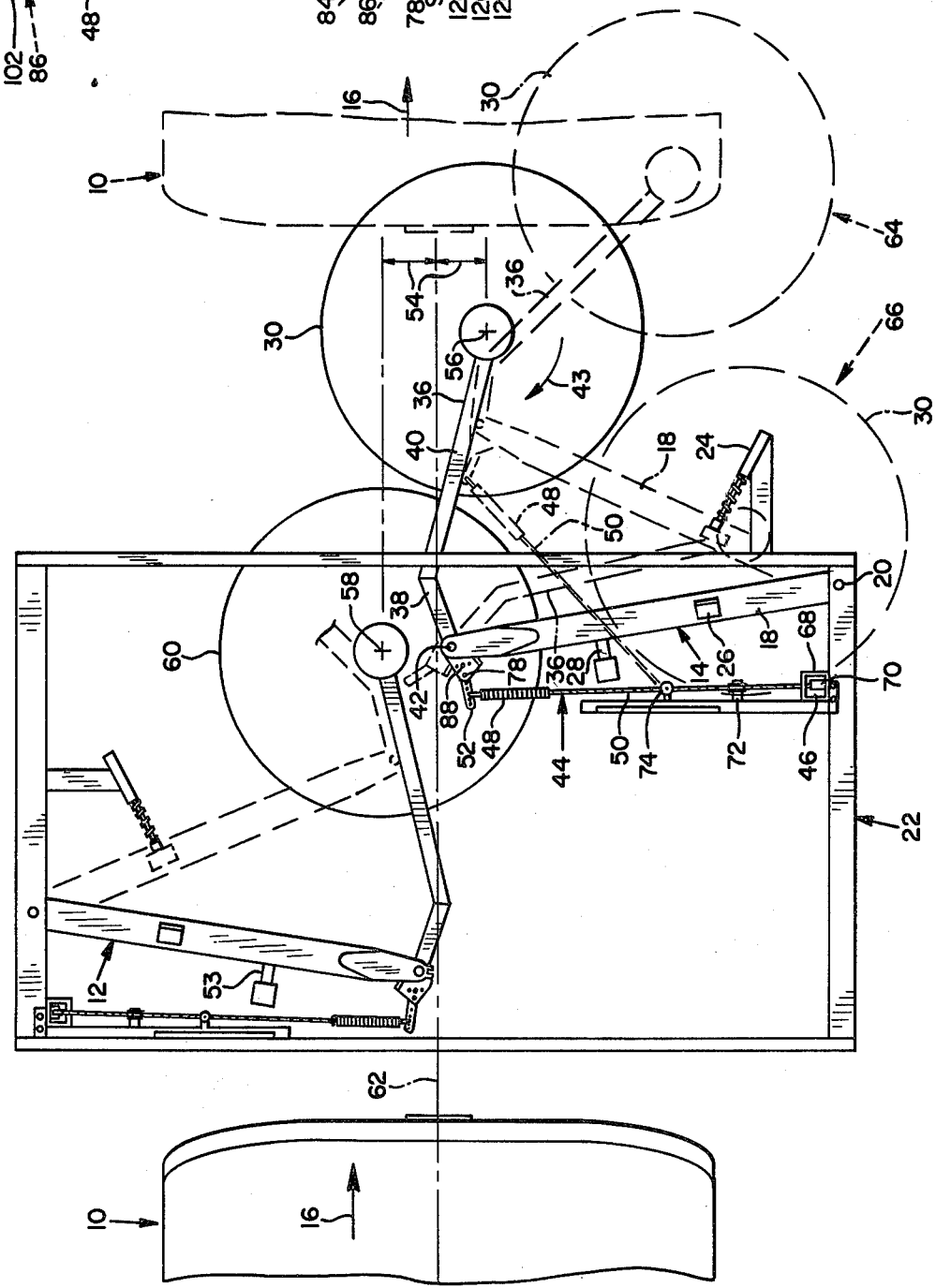

TENSIONING DEVICE FOR WRAPAROUND BRUSHING MECHANISM

BACKGROUND OF THE INVENTION

1. Field of the Invention

This invention relates to car washing apparatus having a rotary brush, and more particularly, to an adjustable tensioning device mounted to a wraparound brushing mechanism selectably to vary the magnitude and location of maximum engagement force exerted by the brush on the exterior of a car during a washing operation.

2. Description of Related Prior Art

Wraparound brushing mechanisms of the type disclosed in U.S. Pat. No. 3,350,733 accomplish a car washing operation with the use of a vertically disposed rotary brush suspended at the end of a pivotable mounting structure that is adapted to urge the brush against the front end, side, and rear end of a car advancing along a conveyor track. The wraparound mechanism includes an inner arm pivotally mounted to a stationary support structure about a fixed axis and an outer arm pivotally mounted intermediate its ends to the outer end of the inner arm. The rotary brush is suspended from the free end of the outer arm.

Initially, the biasing mechanism for a wraparound brush include only an extensible spring disposed between the support structure and the inner end of the pivotable outer arm carrying the rotary brush. The extensible spring applied the force to urge the brush against the exterior of the car. Since the force of a spring increases in proportion to its extension, the wraparound brushing mechanism pivotally moving to follow the contour of the car being washed stretches and shortens the length of the spring, thereby applying an uncontrolled, nonuniform urging force to the brush against the surface of the car.

Undesirable effects of such uncontrolled, nonuniform urging forces arise when the force increases to an amount sufficient to cause the rotary brush to inflict damage to objects mounted on the exterior of the car and to impede the following action of the wraparound mechanism as the brush travels along the exterior of the car.

To overcome this disadvantage, a biasing mechanism having a counterweight system, such as that disclosed in U.S. Pat. No. 3,704,476, was included in the wraparound brushing mechanism to provide a more uniform force exerted by the brush against the surface of the car.

This particular counterweight system comprises a counterweight suspended from a cable which is routed along a system of pulleys mounted to the support structure. The other end of the cable is connected to the end of the spring previously attached to the support structure. Under the operating principles of this biasing mechanism, the initial engagement of the car with the rotary brush causes the spring increasingly to expand until a spring force sufficient to raise the counterweight is attained. As the brush moves along the exterior of the car, the counterweight moves in accordance with orientation of the wraparound mechanism to apply a constant force thereto, thereby to maintain a uniform engagement force by the brush against the surface of the car.

In recent years the growth in demand for use of a car wash facility, especially during peak hours, has necessitated an increase in conveyor speed to process more quickly the cars advancing through the car wash installation. Improvements in the design of brush components and materials have afforded greater scrubbing efficiency to keep pace with the required higher linear speed of the brush along the exterior surface of the car. The speed of brush rotation also has been increased to ensure a thorough cleaning operation.

An increase in conveyor and brush rotation speeds has introduced anomalies in controlling the wraparound brushing mechanism with respect to maintaining contact of the brush against the surface of the car as it advances along the conveyor track. In particular, the direction of brush rotation is selected to assist the linear movement of the brush outward toward the side and rearward toward the end portions of the car. The increased linear and rotational brush speeds tend to propel the brush away from the car as it turns about the front and rear corners thereof. Thus, for a short time the brush loses contact with the side surface of the car, thereby leaving a portion unscrubbed. In addition, in car wash establishments operating at relatively high conveyor and brush rotation speeds, it has been observed that the brush will impact the side of the car precisely at the point where the side view mirror is mounted. This unfortunate event upon occasion has resulted in the detachment of the side view mirror.

A critical parameter affected by an increase in conveyor and brush rotation speeds is the amount of engagement force applied to the brush against the surface of the car when the brush begins to turn about the rear corner of the car to scrub the rear end portion thereof. A particularly large amount of urging force must be applied to the brush during this event to maintain sufficient traction against the surface of the car, otherwise the brush rotating at high speeds will tend to push away from the car as it quickly recedes from the path of brush movement.

It has also been observed that the tendency of the brush to lose contact with or ineffectively scrub a portion of the car under the conditions of increased conveyor and brush rotation speeds is enhanced by misalignment of the wraparound mechanism. Such misalignment can be caused by either improper maintenance or general deterioration stemming from the recurrent impact of the brush with the cars during the initial phase of the washing sequence. In addition, the downwardly sloping floor accommodating the drainage system makes the hitherto less critical alignment procedure of the brushing mechanism difficult to accomplish. Thus, the effect of an intensified pace of processing cars through a washing installation has been to raise the sensitivity of the brushing mechanism to deviations from the specified distribution of scrubbing forces, especially at the aforementioned stages of the washing sequence.

Increasing the mass of the counterweight is not a feasible solution to these problems because such would result in exerting a uniformly distributed, excessive brush force to portions of the car where it is neither necessary nor desirable.

An important object of this invention, therefore, is to provide a tensioning device for a wraparound brushing mechanism to maintain brush contact with a car during the washing thereof during high speed conditions for both the conveyor and rotary brush.

Another important object of this invention is to provide an adjustable tensioning device to apply a controlled, nonuniform force to a brush in engagement with the surface of a car.

A further important object of this invention is to provide an adjustable tensioning device adapted to vary the point of maximum influence of the biasing mechanism to fix the location on the car for application of maximum brush engagement force.

Still another important object of this invention is to provide an adjustable tensioning device to vary the overall amount of leverage applied to the rotary brush contacting the surface of the car.

Another object of this invention is to provide an adjustable tensioning device to compensate for misalignment of the wraparound brushing mechanism to realign the forces necessary for maintaining continuous brush contact with the car.

Another object of this invention is to provide an adjustable tensioning retrofit device that is easily adaptable to an earlier installed wraparound brushing mechanism.

SUMMARY OF THE INVENTION

This invention responds to the problems associated with control of the wraparound brushing mechanism operating at increased conveyor and rotary brush speeds by providing an adjustable tensioning device which is capable of changing the leverage applied to the brushing mechanism for varying the overall amount of brush engagement force against the surface of the car and selecting the location on the car for application of maximum brush engagement force.

The adjustable tensioning device of the present invention is adapted to be mounted to a wraparound brushing mechanism having a support structure positioned at one side of the path of a car advanced forwardly along the path. The wraparound brushing mechanism includes an inner arm pivotally mounted to the support structure about a fixed axis and an outer arm pivotally mounted intermediate its ends to the outer end of the inner arm. A vertically disposed rotary brush is carried by the outer arm at its outer end. A biasing mechanism is operatively connected between the support structure and the inner end of the outer arm for positioning the brush forcibly to engage sequentially the front end, side, and rear end of the car as it advances along the path.

The adjustable tensioning device comprises an element, preferably an extensible lever or horn member, which is disposed between the inner end of the outer arm and the biasing mechanism to provide an independent adjustment means for varying the amount of leverage obtainable to swing the outer arm about its pivot axis and for varying the point of maximum influence of the biasing mechanism thereby to fix the location on the car for application of maximum brush engagement force.

In particular, the adjustable tensioning device includes an extensible horn member pivotally mounted to the inner end of the outer arm. The horn member is disposed generally outwardly from the inner end of the outer arm. Extending along the length of the horn member toward the free end thereof is a series of spaced apart holes arranged in linear relation, each providing an attachment location to receive the end of the spring member of the biasing mechanism previously attached direct to the inner end of the outer arm. These attachment holes provide a selectable adjustment for controlling the effective length of the moment arm associated with the force applied by the counterweight system to move the outer arm of the brushing mechanism about its pivot axis.

The tensioning device is pivotally mounted to the inner end of the outer arm so that the horn member moves in a plane generally parallel to that formed by the inner and outer arms of the brushing mechanism. A series of holes included in the mounting member at the inner end of the outer arm is arranged to achieve axial alignment with an attachment hole in the horn member as it is moved about its pivot axis. The holes in the mounting member are distributed on either side of the longitudinal axis of the inner end portion of the outer arm to provide selectable mounting positions for the horn member to change the position of the moment arm in a manner to vary the point of maximum influence of the biasing mechanism as a function of the location of the brush on the exterior of the car. A bolt passing through the axially aligned holes in the horn member and the mounting member secures the hole member at the desired position.

Thus, the adjustable tensioning device can be fit readily on an earlier installed wraparound brushing mechanism in a car washing establishment to accomplish selectable control of the biasing forces by varying both the overall magnitude and distribution of brush engagement forces against the car as brush rotation and conveyor speeds are changed.

The ability to fix the position of the horn member in angular relation to the longitudinal axis of the inner portion of the outer arm provides a means for tuning the effect of the forces exerted by the biasing mechanism to vary the location on the car of maximum brush engagement force. Therfore, the greatest amount of force is applied only when needed.

For example, in the case of car washing installations operating at high conveyor and brush rotation speeds, the horn member can be positioned so that the greatest amount of brush engagement force is applied when the brush is positioned to turn about the rear corner of the car. This increases the brush force exerted against the car at this particular stage so that the brush remains in a position to maintain sufficient traction to scrub effectively the rear end portion thereof.

The series of holes arranged along the length of the horn member provides a plurality of attachment locations for the biasing mechanisms selectably to change the overall amount of torque applied to the wraparound brushing mechanism thereby to vary the engagement force exerted by the brushes against the surface of the car. This feature is especially helpful to compensate for a change in the amount of brush control force caused by deterioration of the components of the counterweight system or misalignment of the brushing mechanism itself.

The foregoing and other objects, features, and advantages of the present invention will become more apparent from the following detailed description which proceeds with reference to the accompanying drawings.

BRIEF DESCRIPTION OF THE DRAWINGS

In the drawings:

FIG. 1 is a fragmentary plan view of a wraparound brushing mechanism depicting in phantom several operating positions showing the orientation of the adjustable tensioning device.

FIG. 5 is a fragmentary plan view of the pivot junction of the outer arm of the right side wraparound brushing mechanism showing in phantom the selectable operating positions of the adjustable tensioning device with the outer arm in an extended position.

FIG. 6 is a fragmentary plan view of the pivot junction of the outer arm of the right side wraparound brushing mechanism showing in phantom the selectable operating positions of the adjustable tensioning device with the outer arm in the completely folded position.

DETAILED DESCRIPTION

Figure 3:
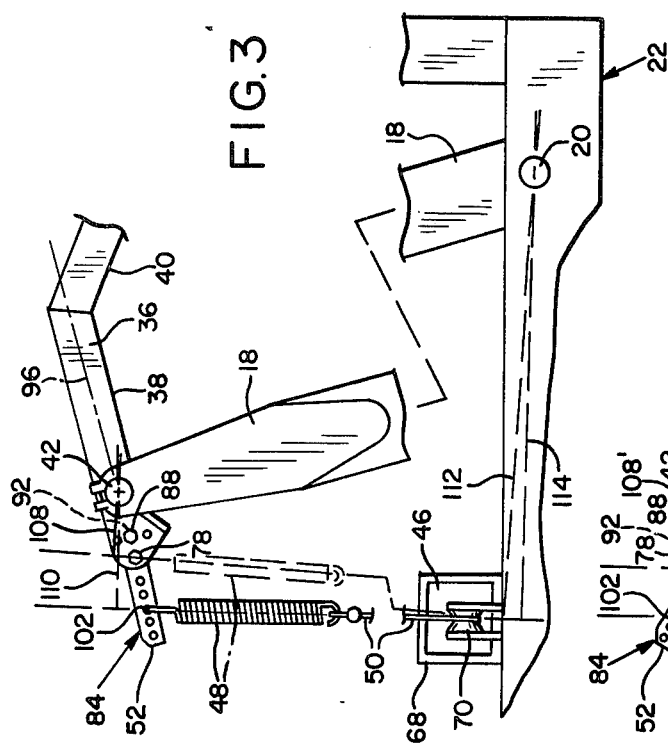
FIG. 3 is a fragmentary plan view of the right side wraparound brushing mechanism depicted in the rest position showing the lines of action of the force applied by the biasing mechanism coupled direct to the outer arm and to the adjustable tensioning device.

Configuration and Structure of the Brushing Mechanisms

FIG. 1 shows a preferred wraparound brushing mechanism supporting rotary brushes in a car wash installation incorporating the present invention. The details of the overall structure and operation of typical wraparound brushing mechanisms are disclosed in U.S. Pat. Nos. 3,350,733 and 3,704,476 and are incorporated by reference herein. The present invention constitutes a retrofit tensioning device modifying the biasing mechanism of wraparound brushing mechanisms of this type. The discussion herein is directed specifically to a biasing mechanism which includes a counterweight system similar to that disclosed in U.S. Pat. No. 3,704,476.

With reference to FIG. 1, a car washing operation is accomplished by advancing car 10 along track 11 (FIG. 2) through a bay having car brushing mechanisms 12 and 14 arranged in allochiral relation and spaced apart along the length of the conveyor. Brushing mechanisms 12 and 14 operate in complementary fashion so that brushing mechanism 12 initially scrubs sequentially the left front end, left side, and left rear end of the car. Upon engagement with car 10 advancing in direction 16, brushing mechanism 14 commences an identical brushing sequence on the right half portion of the car. Car brushing mechanisms 12 and 14 are of otherwise identical construction; therefore, only mechanism 14 will be described in detail.

Mechanism 14 includes inner arm 18 with its inner end mounted to swing about fixed pivot axis 20 on stationary framework 22 supporting the brushing mechanisms. Forward overtravel stop 24 mounted on stationary framework 22 limits the forward or clockwise pivotal movement of inner arm 18 by engaging stop member 26 mounted on the top of inner arm 18. Similarly, rest stop member 28 mounted to the side of inner arm 18 facing the approaching car limits the rearward or counterclockwise pivotal movement of inner arm 18 by engaging a portion of framework 22.

Figure 2:
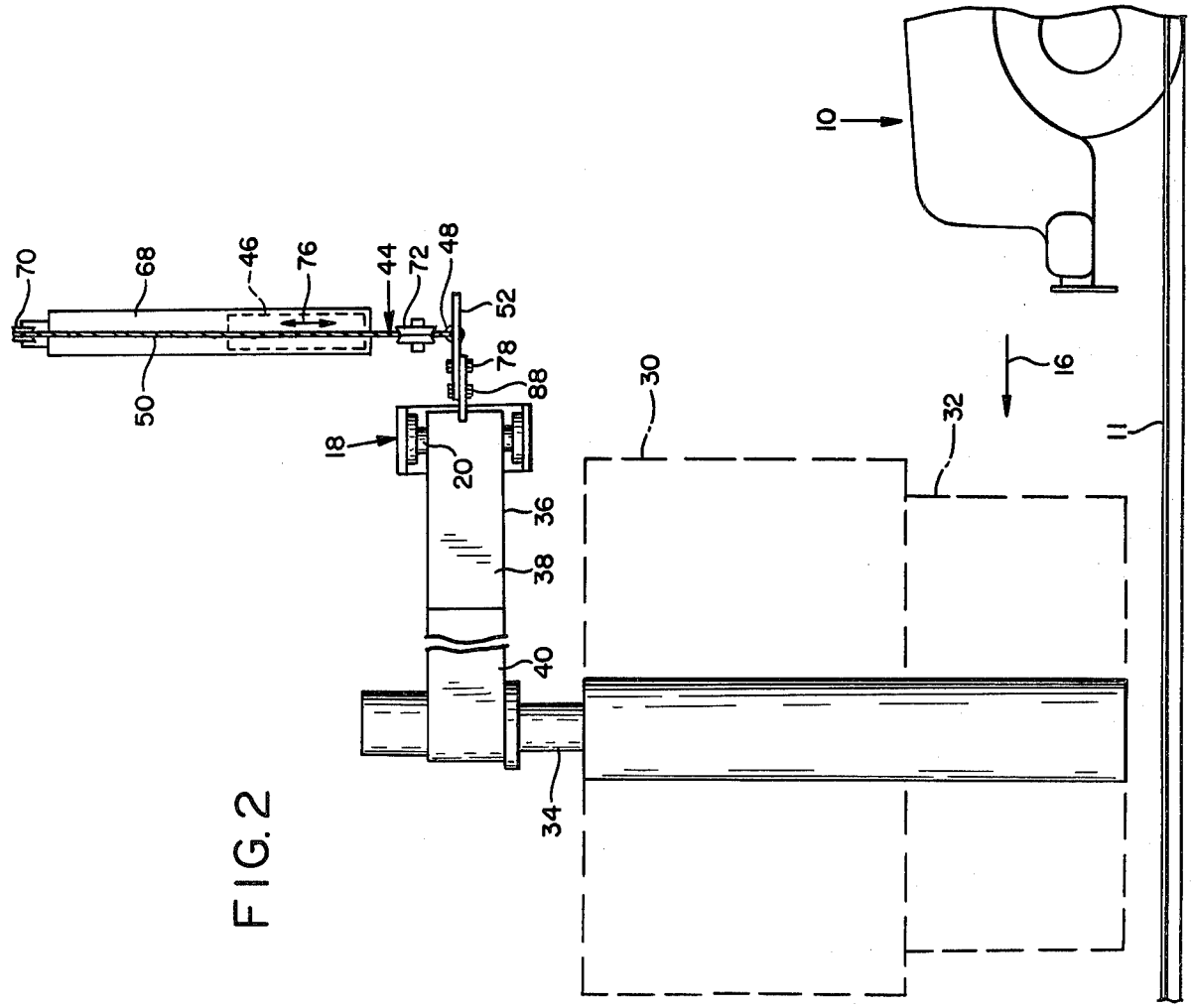
FIG. 2 is a fragmentary side elevation view of the right side brushing mechanism showing the counterweight mechanism.

With reference to FIG. 2, upper rotary brush 30 and lower rotary brush 32 are stacked endwise and attached to vertically disposed shaft 34 which is rotatably mounted to the outer end of outer arm 36. A hydraulic motor (not shown) drives shaft 34 and thereby rotates brushes 30 and 32. Outer arm 36 is an angled, rigid member having inner portion 38 and outer portion 40. Outer arm 36 moves about pivot axis 42 (FIG. 1) positioned at the outer end of inner arm 18 as the rotary brushes move along the exterior of the car. Arrow 43 (FIG. 1) indicates the direction of brush rotation which promotes linear movement of brushes 30 and 32 along the surface of the car in the manner described above. Hereinafter, only the upper brush will be referred to in the description of operation of the invention.

The pivotal movement of brushing mechanism 14 is controlled by the applied force of the advancing car and a counterweight mechanism 44 (FIGS. 1 and 2) that includes counterweight 46, which is connected to an end of spring 48 by cable 50. The other end of spring 48 is attached to the free end of adjustable tensioning lever or horn member 52 of the present invention, which is secured to the inner end of outer arm 36. The parameters relating to the operation of the brushing mechanism as respects the function of the adjustable tensioning device will be further described hereinbelow.

Operation of the Brushing Mechanisms

With reference to FIG. 1, brushing mechanisms 12 and 14 depicted in solid lines engage framework 22 by means of rest stop members 53 and 28, respectively, while in the rest position as shown. A rest position for each brushing mechanism represents the start position in preparation for and the end position after engagement with the car as it advances toward and recedes from, respectively, the rotary brushes.

Dimension 54 indicates the offset of axes of rotation 56 and 58 of brushes 30 and 60, respectively, from centerline 62 of the length of car 10, which advances along a conveyor (not shown) positioned generally centrally within installation framework 22. As shown, each brushing mechanism extends beyond centerline 52, thereby providing overlapping coverage of both the front and rear ends of the car.

With reference to FIG. 1, brushing mechanism 14 is shown in two phantom positions to illustrate the folding action of outer arm 36 resulting from forces exerted by the advancing car and counterweight mechanism 44. Position 64 represents the condition of extreme extension brushing mechanism 14 assumes only as brush 30 turns about the right front corner of the car. Position 66 represents the completely folded configuration brushing mechanism 14 assumes as brush 30 moves along the side of the car.

As it advances in direction 16, car 10 engages and deflects the brushing mechanism simultaneously to clear the path of the car and to move the rotary brushes across the surface thereof. Upon initial contact between car 10 and brush 30, inner arm 18 moves about pivot axis 20 in a clockwise sense and begins to strength spring 48, thereby eliminating the sudden shock of impact.

During the travel of brush 30 across the right front end of the car, inner arm 18 pivotally moves in a clockwise sense from rest stop member 28 toward forward overtravel stop 24. Spring 48 continues to stretch until sufficient force is generated to raise counterweight 46, which is suspended within standard 68 in the form of a hollow support member of framework 22. Counterweight 46 is operatively connected to spring 48 by cable 50, which is routed along framework 22 by pulleys 70, 72, and 74 and secured to the top of the counterweight. Counterweight 46 moves along bidirectional path 76 within standard 68 in response to the pivotal movements of the brushing mechanism as it follows the contour of the car being washed.

The primary reason why outer arm 36 is formed at an angle is to increase the brush engagement force against the exterior of the car as the wraparound mechanism assumes the orientation depicted as position 64. Outer arm 36 "knuckles" inwardly to direct a greater component of urging force to brush 30 against the surface of the car as the wraparound mechanism moves the brushes about the right front corner thereof.

After brush 30 turns about the right front corner, outer arm 36 folds in a clockwise sense toward inner arm 18. Outer arm 36 reaches the completely folded position 66 after the brush has moved past the mounting location of a side view mirror (not shown). After brush 30 has turned about the right front corner, inner arm 18 returns to rest stop member 28. Inner arm 18 is urged against rest stop member 28 as outer arm 36 remains in the folded position to follow along the length of and urge brush 30 against the right side of the car.

As brush 30 turns about the right rear corner, inner arm 18 remains positioned against rest stop member 28 as outer arm 36 unfolds to urge the brush against the rear end of the car. As brush 30 proceeds along the right rear end of the car toward centerline 62 thereof, outer arm 36 pivotally moves in a counterclockwise sense as brushing mechanism 14 assumes its rest position.

Adjustable Tensioning Device

With reference to FIGS. 5 and 6, extensible horn member 52 is pivotally mounted to the inner end of outer arm 36 for movement in a plane generally parallel to the plane formed by inner arm 18 and outer arm 36. The hole previously used to receive an end of spring 48 receives bolt 78 to form a pivot axis for horn member 52. Horn member 52 is fixed at one of three selectable positions 82, 84, 86 by passing bolt 88 through one of three holes 90, 92 and 94, respectively, arranged to be in axial alignment with a hole located at the inner end of horn member 52 as it pivots in an arcuate path. Holes 90 and 94 are arranged on the inner end of outer arm 36 to provide a positioning hole situated on either side of the longitudinal axis 96 of inner portion 38 of outer arm 36. This adjustment feature permits tuning of the response of the wraparound brushing mechanism to the force exerted by the biasing mechanism to fix the location on the car for application of maximum brush engagement force as will be further hereinafter described.

A series of five holes 98, 100, 102, 104 and 106 (FIG. 6) arranged linearly along the length of horn member 52 provides a selection of attachment location means for changing the effective length of the moment arm of outer arm 36 to vary the overall amount of leverage or mechanical advantage to swing the brushing mechanism and urge the brush against the surface of the car.

Figure 4:
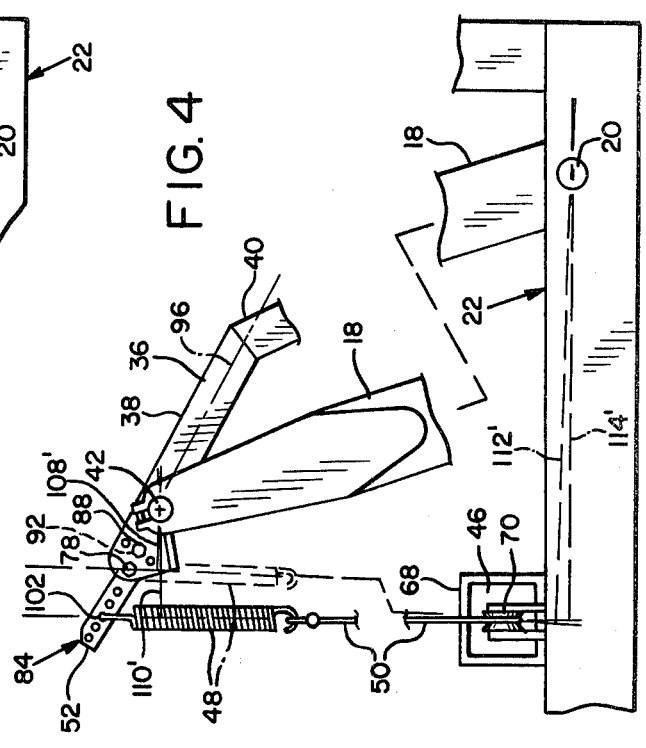
FIG. 4 is a fragmentary plan view of the right side wraparound brushing mechanism depicted in the completely folded position showing the lines of action of the force applied by the biasing mechanism coupled direct to the outer arm and to the adjustable tensioning device.

FIGS. 3 and 4 show brushing mechanism 14 in its rest and completely folded positions, respectively. In each figure, spring 48 is shown in phantom attached direct to the point on the inner end of outer arm 36 as is done for the conventional wraparound brushing mechanism. Spring 48 shown in solid lines is attached to horn member 52 of the present invention. Horn member 52 is shown in center position 84, and spring 48 is inserted in center attachment hole 102.

In FIG. 3, which shows the brushing mechanism in the rest position, line 108 represents the moment arm extending from pivot axis 42 of outer arm 36 to the line of force of spring 48 shown in phantom. Similarly, line 110 represents the moment arm extending from pivot axis 42 of outer arm 36 to the line of force of spring 48 attached to horn member 52.

Line 112 represents the moment arm extending from pivot axis 20 of inner arm 18 to the line of force of spring 48 shown in phantom. Similiarly, line 114 represents the moment arm extending from pivot axis 20 of inner arm 18 to the line of force of spring 48.

In FIG. 4, the moment arms corresponding to those described for FIG. 3 are shown for brushing mechanism 14 in its completely folded position and are designated by identical descriptive numerals followed by primes.

FIGS. 3 and 4 show clearly that the addition of horn member 52 extends the effective length of the moment arm and thereby increases the torque for pivotal movement of outer arm 36; whereas horn member 52 provides negligible influence on the movement of inner arm 18 about its pivot axis. A substantial increase in mechanical advantage pivotally to move outer arm 36 from both the rest and folded positions can be achieved by attaching spring 48 near the free end of horn member 52, thereby increasing the effective length of the horn.

With reference to FIGS. 5 and 6, wraparound brushing mechanism 14 is shown in the rest and completely folded positions, respectively. In each case, spring 48 of the biasing mechanism is inserted into center hole 102 along the length of horn member 52, which is disposed in center position 84. The remaining two positions 82 and 84 of horn member 52 are shown in phantom.

In FIG. 5, which shows the brushing mechanism in the rest position, each line 116, 118, and 120 drawn through center attachment hole 102 of horn member 52 in each of the three selectable positions 82, 84, and 86, respectively, represents the line of action of the tensioning force exerted by the biasing mechanism for each of the three positions shown. Each line 122, 124, and 126, extending from pivot axis 42 to its corresponding line of force 116, 118, and 120 represents the moment arm of outer arm 36 for each of horn member positions 82, 84, and 86, respectively.

In FIG. 6, the moment arms corresponding to those described for FIG. 5 are shown for brushing mechanism 14 in its completely folded position and are designated by identical descriptive numerals followed by primes.

It is apparent from FIG. 5 that position 84 of horn member 52 provides the longest moment arm and thereby achieves the greatest mechanical advantage to provide the maximum urging force to the brush when the brushing mechanism is in the rest position. Similarly, as shown in FIG. 6, position 86 of horn member 52 provides the maximum mechanical advantage when the brushing mechanism is in the completely folded position. Therefore, the ability to move horn member 52 about its pivot to one of a series of fixed positions provides a tuning adjustment to provide maximum brushing force at a particular location on the car.

As was stated hereinabove, the critical event during the washing cycle occurs when rotary brush 30 approaches the rear end of car 10 to turn the corner thereof and scrub the rear end of the car as it is drawn away by the conveyor. In a well-aligned wraparound brushing mechanism, the desired position of horn member 52 would be that which provides the greatest leverage whenever the brush is about to turn the rear corner of the automobile. However, a brushing mechanism that is in misalignment may require a different distribution of forces to compensate for the misalignment. The dual adjustment feature of the present invention materially assists in providing a convenient means not only to vary the overall brush engagement force exerted by the biasing mechanism, but also to distribute the maximum brushing force to the section of the car especially critical to the washing operation.

Having illustrated and described what is presently the preferred embodiment of my invention, it should be apparent to those skilled in the art that the embodiment may be modified in arrangement and detail without departing from the principles of the invention which are intended to be illustrated but not limited by the disclosure, I therefore claim as my invention all such modifications as come within the true spirit and scope of the following claims.

What is claimed is:

1. In a wraparound brushing device having a support structure positioned at one side of a path of a car advanced forwardly along the path; an inner arm and an outer arm, the inner arm at one end thereof being pivotally mounted to the support structure about a fixed axis, and the outer arm being pivotally mounted intermediate its ends to the outer end of the inner arm; a rotary brush carried by the outer arm at its outer end; and a biasing mechanism for the brush forcibly to engage sequentially the front end, side, and rear end of the car as it advances along the path, the improvement comprising:
 an adjustable tensioning means operatively coupled to the inner end of the outer arm and the biasing mechanism to provide adjustment means for varying the amount of leverage attainable to swing the outer arm about its pivot axis and for selecting a desired location on the car for application of a particular brush engagement force, the adjustable tensioning means including an element mounted to and extending from the inner end of the outer arm, the element having separate first and second adjustment means,
 the first adjustment means comprising means to receive the biasing mechanism and means to change the effective length of the element to vary the amount of leverage applied pivotally to move the outer arm; and
 the second adjustment means comprising means selectably to mount the element in a plurality of positions lying in a plane generally parallel to the plane formed by the inner and outer arms to vary the point of maximum influence of the biasing mechanism and thereby fix the location on the car for application of maximum brush engagement force.

2. In a wraparound brushing device having a support structure positioned at one side of a path of a car advanced forwardly along the path; an inner arm and an outer arm, the inner arm at one end thereof being pivotally mounted to the support structure about a fixed axis, and the outer arm being pivotally mounted intermediate its ends to the outer end of the inner arm; a rotary brush carried by the outer arm at its outer end; and a biasing mechanism for the brush forcibly to engage sequentially the front end, side, and rear end of the car as it advances along the path, the improvement comprising:
 an adjustable tensioning means operatively coupled to the inner end of the outer arm and the biasing mechanism to provide adjustment means for varying the amount of leverage attainable to swing the outer arm about its pivot axis and for selecting a desired location on the car for application of a particular brush engagement force, the adjustable tensioning means including an element mounted to and extending from the inner end of the outer arm, the element having separate first and second adjustment means,
 the first adjustment means comprising a plurality of attachment location means arranged in substantially linear relation, each attachment location being adapted to receive the biasing mechanism to provide a selectable amount of leverage applied during the pivotal movement of the outer arm; and
 the second adjustment means comprising means selectably to mount the element in a plurality of positions lying in a plane generally parallel to the plane formed by the inner and outer arms to vary the point of maximum influence of the biasing mechanism and thereby fix the location on the car for application of maximum brush engagement force.

3. The wraparound brushing device of claims 1 or 2 wherein the element comprises a horn member and the mounting means of the second adjustment means comprises means to permit pivotal movement of the horn member and means selectably to secure same at each of the mounting positions.

4. The wraparound brushing device of claims 1 or 2 wherein the mounting positions are distributed on either side of the longitudinal axis of the inner end portion of the outer arm.

* * * * *

UNITED STATES PATENT AND TRADEMARK OFFICE
CERTIFICATE OF CORRECTION

PATENT NO. : 4,445,246
DATED : May 1, 1984
INVENTOR(S) : DANIEL C. HANNA

It is certified that error appears in the above-identified patent and that said Letters Patent is hereby corrected as shown below:

Column 1, line 28, "include" should be --included--;

Column 4, line 20, after "the", "hole" should be --horn--;

Column 6, line 39, after "centerline", "52" should be --62--;

Column 6, line 57, after "to", "strength" should be --stretch--; and

Column 8, line 33, after "and", "84" should be --86--.

Signed and Sealed this

Thirtieth Day of October 1984

[SEAL]

Attest:

GERALD J. MOSSINGHOFF

Attesting Officer

Commissioner of Patents and Trademarks